(12) United States Patent
Reinbold (10) Patent No.: US 10,256,042 B2
(45) Date of Patent: Apr. 9, 2019

(54) CONTACT PART FOR ELECTRICALLY CONNECTING END-FACE CONTACT LAYERS ON THE END FACES OF A PLASTIC FILM CAPACITOR WINDING OF AN ENCASED ELECTRIC SINGLE-PHASE OR THREE-PHASE CAPACITOR, AND ENCASED ELECTRIC SINGLE-PHASE AND THREE-PHASE CAPACITORS COMPRISING SAME

(75) Inventor: Hans-Georg Reinbold, Sexau (DE)

(73) Assignee: FRAKO KONDENSATOREN- UND ANLAGENBAU GMBH, Teningen (DE)

( * ) Notice: Subject to any disclaimer, the term of this patent is extended or adjusted under 35 U.S.C. 154(b) by 973 days.

(21) Appl. No.: 14/126,591

(22) PCT Filed: May 15, 2012

(86) PCT No.: PCT/EP2012/002083
§ 371 (c)(1),
(2), (4) Date: Dec. 16, 2013

(87) PCT Pub. No.: WO2012/171605
PCT Pub. Date: Dec. 20, 2012

(65) Prior Publication Data
US 2014/0111905 A1    Apr. 24, 2014

(30) Foreign Application Priority Data
Jun. 15, 2011 (DE) .......................... 10 2011 104 255

(51) Int. Cl.
*H01G 4/232* (2006.01)
*H01G 4/236* (2006.01)
(Continued)

(52) U.S. Cl.
CPC ............... *H01G 4/228* (2013.01); *H01G 2/00* (2013.01); *H01G 4/232* (2013.01); *H01G 4/32* (2013.01); *H01R 4/26* (2013.01)

(58) Field of Classification Search
CPC ........ H01G 4/255; H01G 4/232; H01G 4/236; H01G 4/242; H01G 4/228
(Continued)

(56) References Cited

U.S. PATENT DOCUMENTS

| 6,222,720 B1* | 4/2001 | Aoki | H01G 9/155 361/301.1 |
| 2003/0143459 A1* | 7/2003 | Kunimoto | H01M 2/206 429/158 |
| 2012/0257321 A1* | 10/2012 | Lai | H01G 4/30 361/271 |

* cited by examiner

*Primary Examiner* — Eric Thomas
*Assistant Examiner* — Arun Ramaswamy
(74) *Attorney, Agent, or Firm* — Jonathan M. D'Silva; MMI Intellectual Property (57) ABSTRACT

The invention relates to a contact part (20) for electrically connecting end-face contact layers on the end faces of a plastic film capacitor winding (10) of an encased electric single-phase or three-phase capacitor to a terminal wire (18, 34) or a connecting wire, comprising a preferably flat contact support with a terminal region for contacting a terminal wire (18, 34) or a connecting wire; comprising at least one contact piece (26) with at least one contact tip, said contact piece (26) extending upwards or downwards from the contact support in a substantially vertical manner, in order to establish an electric connection to an end-face contact layer (12, 14) by pressing the contact tip into said end-face contact layer (12, 14); and comprising a penetration depth-limiting device for limiting the penetration depth of the contact tip or the contact tips in the end-face contact layer (12, 14). The invention also relates to encased single-
(Continued)

phase and three-phase capacitors comprising said contact part.

3 Claims, 6 Drawing Sheets

(51) Int. Cl.
  *H01G 4/242* (2006.01)
  *H01G 4/228* (2006.01)
  *H01G 2/00* (2006.01)
  *H01G 4/32* (2006.01)
  *H01R 4/26* (2006.01)
(58) Field of Classification Search
  USPC ......... 361/502, 821, 763, 531, 301.5, 301.4,
  361/530, 328
  See application file for complete search history.

CONTACT PART FOR ELECTRICALLY CONNECTING END-FACE CONTACT LAYERS ON THE END FACES OF A PLASTIC FILM CAPACITOR WINDING OF AN ENCASED ELECTRIC SINGLE-PHASE OR THREE-PHASE CAPACITOR, AND ENCASED ELECTRIC SINGLE-PHASE AND THREE-PHASE CAPACITORS COMPRISING SAME

The present application is a National Stage application of International Patent Application Number PCT/EP2012/002083 filed May 15, 2012, which claims priority to German Patent Application 102011104255.9, filed Jun. 15, 2011, both of which are incorporated herein by reference.

The present invention relates to a contact part for electrically connecting end-face contact layers on the end faces of a plastic film capacitor winding of an encased electric single-phase or three-phase capacitor comprising a terminal wire or a connecting wire and to an encased electric single-phase capacitor and to an encased electric three-phase capacitor.

For example, DE 10 2005 045 978 B3 discloses encased electric single-phase and three-phase capacitors of the type mentioned at the outset. In order to produce such capacitors, capacitor windings consisting of metalized polypropylene film are sprayed on both end faces with metal, generally zinc. The resulting end-face contact layers (contact areas) are connected to the connecting and terminal wires by means of soldered joints. The connecting and terminal wires usually consist of copper. Some are also tin-plated on the surface and can therefore be soldered very easily per se. The end-face contact layers consisting of zinc of the capacitor windings can only be soldered with great difficulty, however. This means that considerable supply of heat with relatively high soldering temperatures is required. Very aggressive fluxes and, if possible, lead-containing solder are required for a good soldering result. In addition, well trained personnel are required in order to achieve consistently good soldering.

The invention is therefore based on the object of enabling simpler and therefore less expensive production of encased electric single-phase and three-phase capacitors.

This object is achieved according to the invention by a contact part for electrically connecting end-face contact layers on the end faces of a plastic film capacitor winding of an encased electric single-phase or three-phase capacitor comprising a terminal wire or a connecting wire, comprising a preferably planar contact carrier with a terminal region for making contact with a terminal wire or a connecting wire, at least one contact piece which extends upwards or downwards substantially perpendicularly from the contact carrier and has at least one contact tip for producing an electrical connection to an end-face contact layer by the contact tip being pushed into said end-face contact layer, and a penetration depth limitation device for limiting the penetration depth of the contact tip or the contact tips in the end-face contact layer. The terminal wire or connecting wire may be quite generally a terminal conductor or connecting conductor for example consisting of litz wires.

Furthermore, this object is achieved by an encased electric single-phase capacitor comprising a housing, a housing cover, a plastic film capacitor winding which is arranged in the housing and whose end faces are each provided with an end-face contact layer, and two terminal wires which are passed through the housing cover, characterized in that the terminal wires are electrically connected to the end-face contact layers via a respective contact part wherein the contact parts are electrically connected to the respective end-face contact layer without the use of solder.

In addition, this object is achieved by an encased electric three-phase capacitor comprising a housing, a housing cover, three plastic film capacitor windings, which are arranged one above the other in the housing, are delta-connected to one another and whose end faces are each provided with an end-face contact layer, and three terminal wires which are passed through the housing cover, characterized in that the terminal wires are electrically connected to the corresponding end-face contact layer of the capacitor windings via a respective contact part, wherein the contact parts are electrically connected to the respective corresponding end-face contact layer without the use of solder.

In accordance with a particular embodiment of the contact part, at least one contact piece extends upwards substantially perpendicularly from the contact carrier and at least one contact piece extends downwards substantially perpendicularly from the contact carrier.

Advantageously, the contact carrier is substantially ring-shaped, and the terminal region is a terminal lug, preferably in the plane of the contact carrier. The two abovementioned measures can of course also be provided independently of one another.

Favorably, a plurality of contact pieces is preferably provided equidistantly on the outer edge of the ring-shaped contact carrier and extends upwards or downwards substantially perpendicularly uniformly therefrom.

It is also conceivable for a plurality of contact pieces to be preferably provided equidistantly on the inner edge of the ring-shaped contact carrier and to extend downwards or upwards perpendicularly uniformly therefrom. Thus, the contact pieces can be provided only on one side (at the top or at the bottom) or on both sides.

In accordance with a further particular embodiment of the invention, the penetration depth limitation device has a plurality of resting pieces with resting areas or resting points.

Favorably, the resting pieces or some of said resting pieces are preferably provided equidistantly on the outer rim of the ring-shaped contact carrier and extend upwards or downwards substantially perpendicularly uniformly therefrom.

Provision can also be made for the resting pieces or some of said resting pieces to be preferably provided equidistantly on the inner rim of the ring-shaped contact carrier and to extend upwards or downwards substantially perpendicularly uniformly therefrom. Precisely in the same way as the contact pieces, the resting pieces can therefore be provided on one or both sides.

Favorably, the base material of the contact part is preferably metal with good electrical conductivity, preferably brass or copper. However, it is also conceivable to use, for example, spring steel or generally electrically conductive material, such as, for example, electrically conductive plastic.

Advantageously, the base material has a tin plating.

Favorably, in the case of the encased electric three-phase capacitor, in each case one of the contact parts is provided on the end faces of the uppermost and lowermost capacitor windings, and in each case one of the contact parts is provided between the capacitor windings for making contact with each of the two adjacent end-face contact layers, and a connecting wire for electrically connecting the uppermost contact part to the lowermost contact part is provided. In each case one contact part with contact pieces protruding on one side, to be precise towards the respective end-face contact layer, can be provided on the uppermost and lowermost capacitor windings, while contact parts with contact pieces protruding in each case on both sides should be provided between the capacitor windings. In this case, a corresponding arrangement of resting pieces of course also makes sense.

Favorably, in the case of the encased electric three-phase capacitor, the connecting wire is electrically connected to the uppermost and lowermost contact parts by spot welding, crimping or soldering.

In accordance with a particular embodiment of the encased capacitors, the contact parts are at least partially pressed into the respective end-face contact layer. For example, once the capacitor windings or capacitor winding column have been installed in the housing, the contact tips can be pressed into the end-face contact layer(s) with a corresponding press-in pressure. The compressive force can be maintained until the holding ring or the holding bead is brought into position. Thus, the contact tips remain in the pressed-in position.

Advantageously, the terminal wires are electrically connected to the respective contact part by spot welding, crimping or soldering.

In accordance with a further particular embodiment of the invention, the plastic film capacitor windings are produced from plastic films provided with a metal layer, in particular metalized polypropylene films.

Finally, provision can alternatively be made for the plastic film capacitor windings to be produced from metal films which are insulated from one another by a plastic film.

The invention is based on the surprising discovery that the encased electric capacitors can be produced more easily and therefore at less expense by virtue of the electrical connection to the end-face contact layers without the use of solder. For example, in the case of an encased electric three-phase capacitor, i.e. with three capacitor windings, in total nine critical soldering operations and two connecting wires are no longer required. In addition, the quality of the electrical connection has a longer life because the films are no longer damaged by the heat during the soldering operation and therefore the electrical connection between the vapor-deposited film and the end-face contact layers is not weakened, and smaller fluctuations in quality occur since production using a precisely adjustable pressure for pushing or pressing the contact parts into the end-face contact layers is possible. In addition, automation of the production of the encased capacitors (power capacitors) or some of said encased capacitors is more easily possible.

Further features and advantages of the invention are given in the attached claims and the description below, in which:

Figure 1:
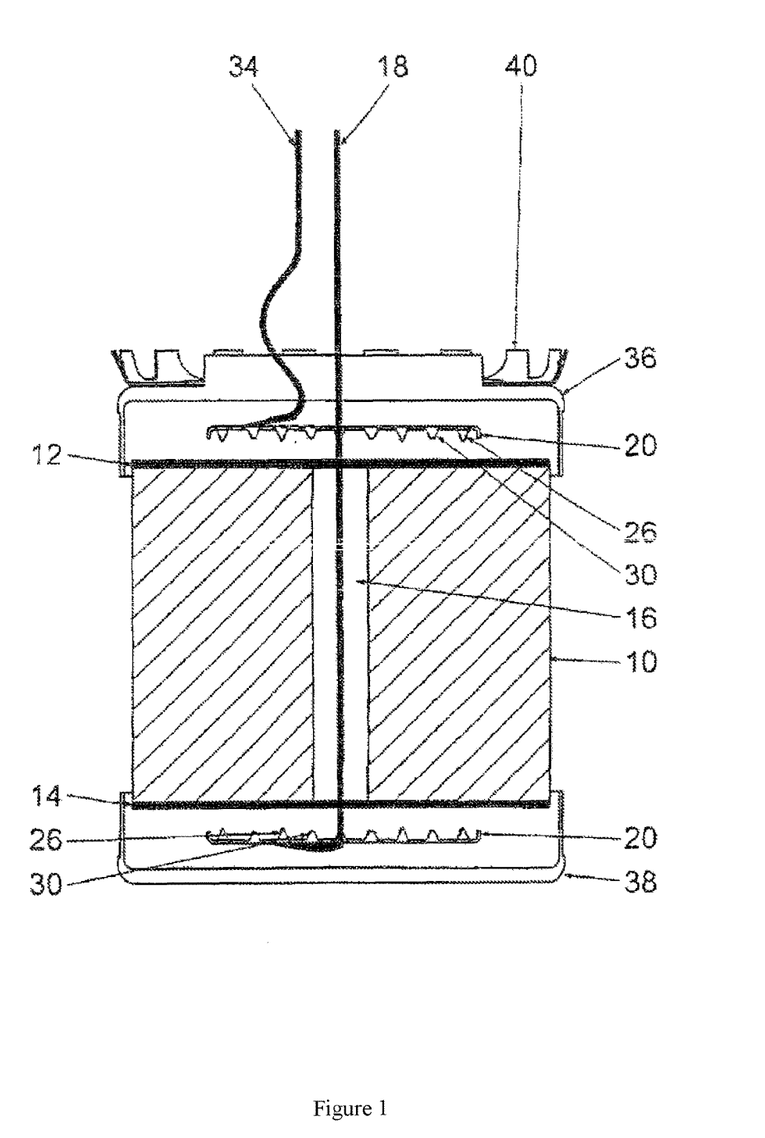
FIG. 1 shows a longitudinal sectional view of an encased electric single-phase capacitor in accordance with a particular embodiment of the invention in a production stage.

FIG. 1 shows a plastic film capacitor winding 10, whose end faces are each provided with an end-face contact layer 12 and 14 consisting of zinc, for example. A terminal wire 18 extends from the top to the bottom through the hollow capacitor winding core 16. The upper end of the terminal wire 18 is passed through a housing cover after production of an encased electric single-phase capacitor with said plastic film capacitor winding 10.

Figure 5:
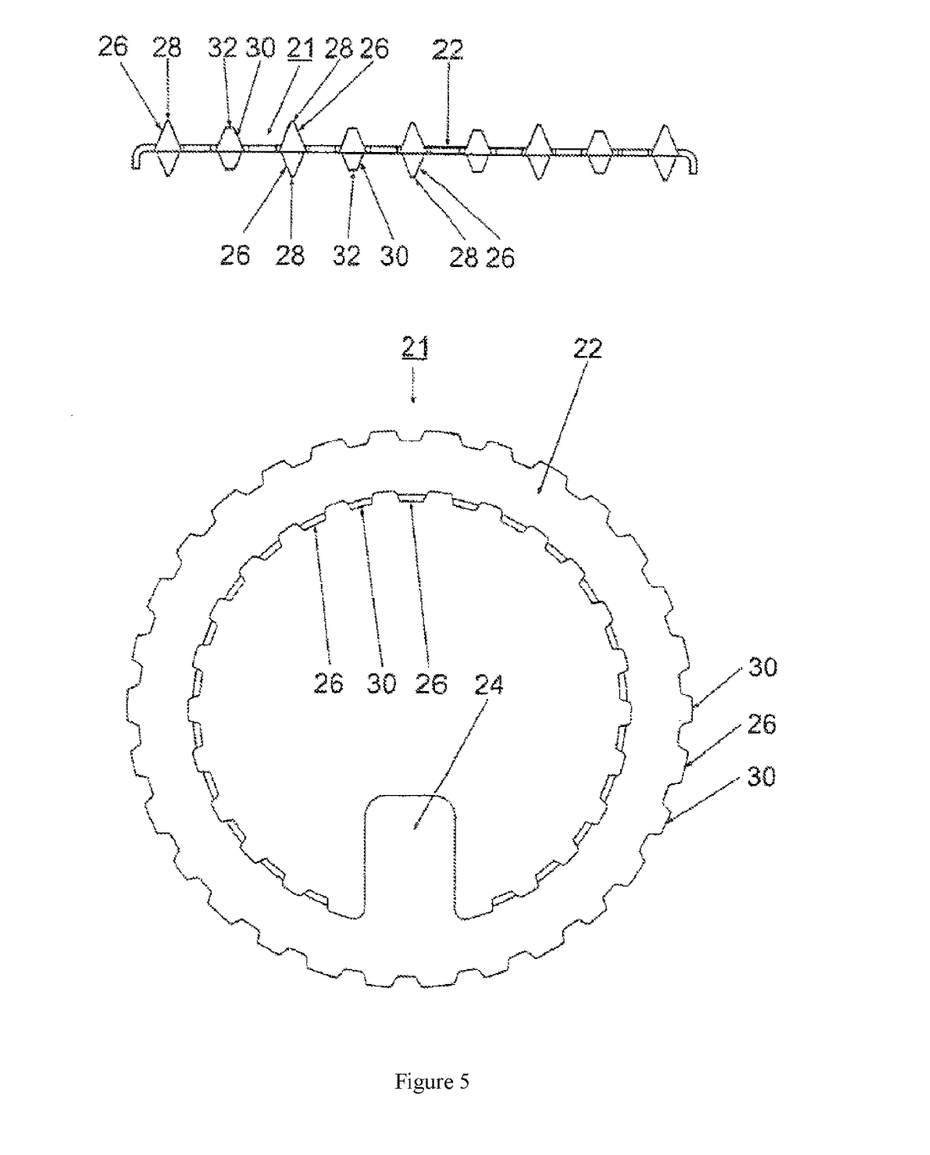
FIG. 5 shows a side view (top) and a plan view from above (bottom) of a contact part in accordance with a particular embodiment of the invention.
Figure 6:
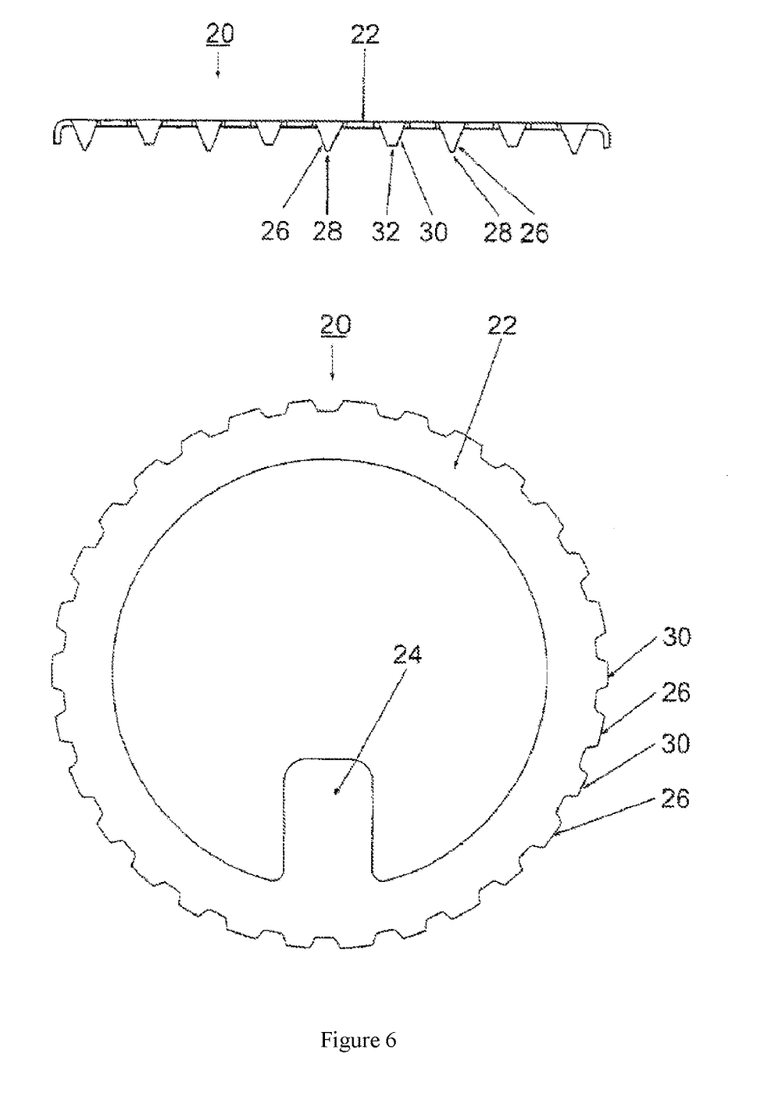
FIG. 6 shows a side view (top) and a plan view from above (bottom) of a contact part in accordance with a further particular embodiment of the invention.

The lower end of the terminal wire 18 is electrically connected to a contact part 20 shown in FIG. 6 by spot welding, crimping or soldering. As can be seen from FIG. 6, the contact part 20 has a substantially ring-shaped, flat contact carrier 22 and a terminal lug 24 which extends inwards from the contact carrier 22 in the same plane. Contact pieces 26 each having a contact tip 28 and resting pieces 30 with resting areas 32, of which only some are identified, are arranged peripherally, equidistantly and alternately on the outer rim. The resting pieces each protrude to a lesser extent than the contact pieces. The contact part 21 shown in FIG. 5 differs from that 20 shown in FIG. 6 in that the contact pieces 26 and resting pieces 30 are not provided on one side but on both sides. Both the contact pieces 26 and the resting pieces 30 extend downwards on the outer rim, while the contact pieces 26 and the resting pieces 30 extend upwards on the inner rim.

In FIG. 1, the contact part 20 shown in FIG. 6 is arranged in such a way that the contact pieces 26 and resting pieces 30 point upwards, i.e. towards the end-face contact layer 14.

A contact part 20 shown in FIG. 6, but with downwards protruding contact pieces 26 and resting pieces 30, is likewise arranged above the upper end-face contact layer 12. This is electrically connected to a further terminal wire 34 by spot welding, crimping or soldering.

Furthermore, in each case one upper insulating cap 36 and one lower insulating cap 38 are positioned already from above and from below. In addition, a holding ring 40 has already been arranged on the upper insulating cap 36.

Figure 2:
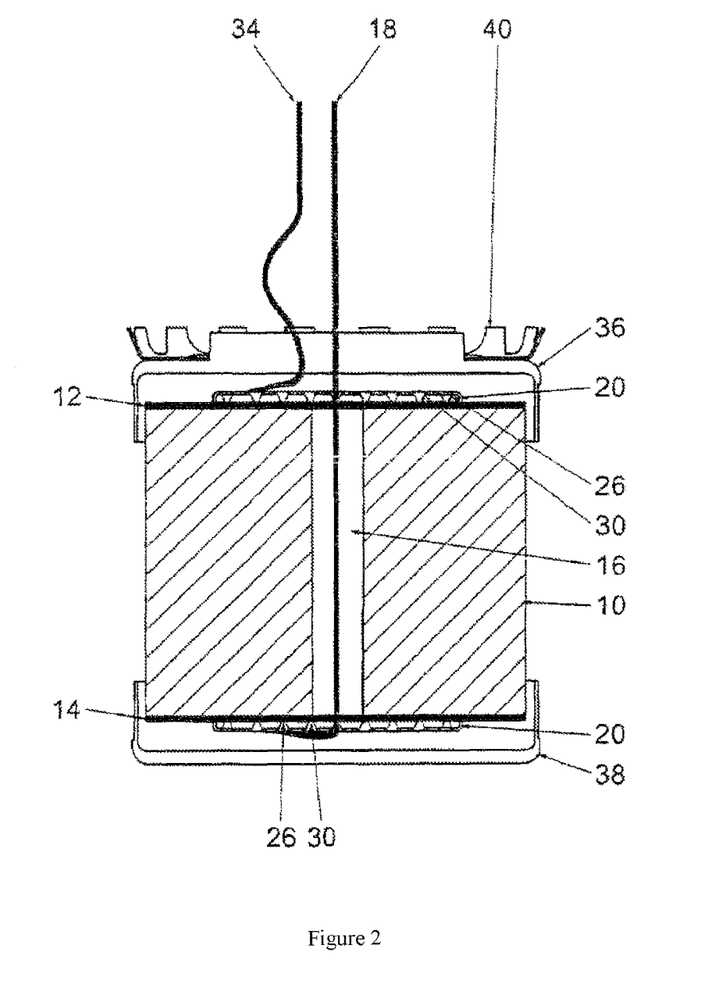
FIG. 2 shows a longitudinal sectional view of the encased capacitor shown in FIG. 1 during a later production stage.

In FIG. 2, the upper contact part 20 and the lower contact part 20 have already been pressed against the respective end-face contact layer 12 and 14, to be precise in such a way that the contact tips 28 are pressed into the end-face contact layers 12 and 14, respectively, and therefore an electrical connection is achieved. As can be seen from a comparison of FIGS. 1 and 2, the insulating caps 36 and 38 in FIG. 2 are not only positioned but are pushed completely onto the plastic film capacitor winding. The pushing-in process can be performed during installation of the plastic film capacitor winding 10 in a housing (not shown) by corresponding compressive force on the upper insulating cap 36 and the lower insulating cap 38. In general, sheath insulation (not shown) is also provided.

Figure 3:
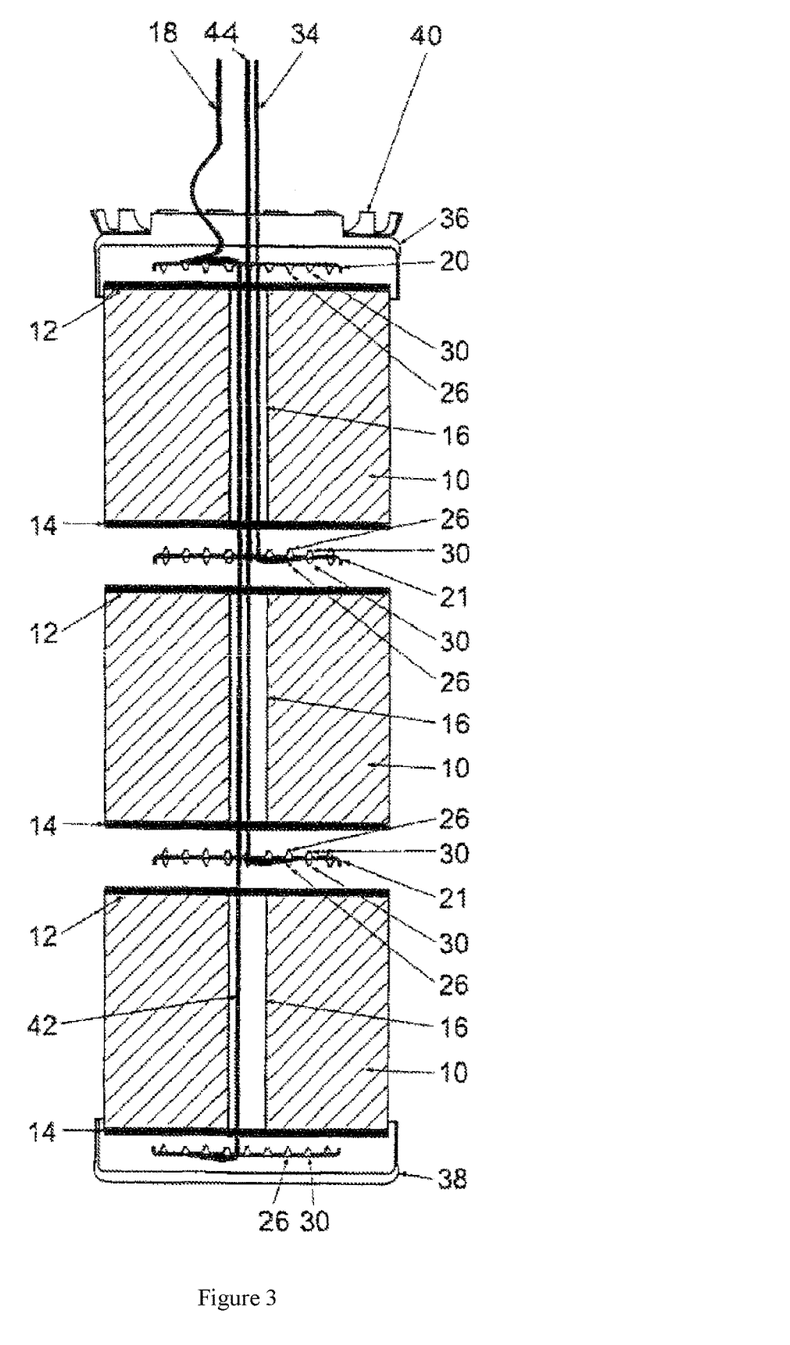
FIG. 3 shows a longitudinal sectional view of an encased electric three-phase capacitor in accordance with a particular embodiment of the invention in a production stage.
Figure 4:
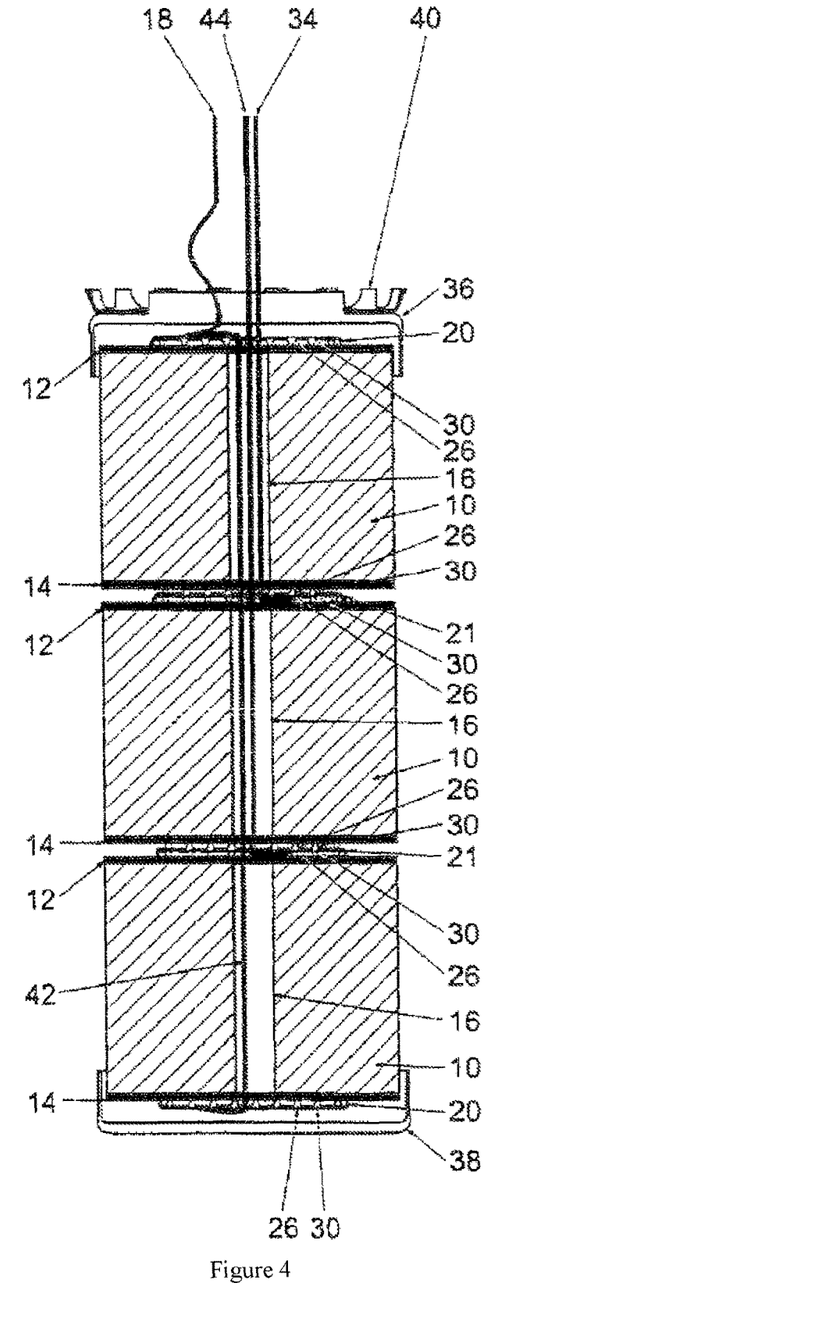
FIG. 4 shows a longitudinal sectional view of the encased capacitor shown in FIG. 3 during a later production stage.

FIGS. 3 and 4 show the same for an encased electric three-phase capacitor. In order to produce an encased electric three-phase capacitor, three plastic film capacitor windings 10 are arranged in the form of a column one above the other. A contact part 20 shown in FIG. 6 with downwardly protruding contact pieces 26 and resting pieces 30 is arranged above the upper end-face contact layer 12 of the uppermost plastic film capacitor winding 10, and a contact part 20 as shown in FIG. 6 with upwardly protruding contact pieces 26 and resting pieces 30 is arranged below the lower end-face contact layer 14 of the lowermost plastic film capacitor winding 10. A contact part 21 as shown in FIG. 5 is arranged between the uppermost plastic film capacitor winding 10 and the central plastic film capacitor winding 10, and a contact part 21 as shown in FIG. 5 is likewise arranged between the central plastic film capacitor winding 10 and the lowermost plastic film capacitor winding 10. The uppermost contact part 20 is electrically connected to a terminal wire 18 by spot welding, crimping or soldering. Furthermore, a connecting wire 42 extends through the capacitor winding cores 16 of the three plastic film capacitor windings from the uppermost contact part 20 to the lowermost contact part 20. The connecting wire 42 is electrically connected both to the uppermost contact part 20 and to the lowermost contact part 20, in each case by means of spot welding, crimping or soldering.

A terminal wire 20 extends from the top through the hollow capacitor winding core 16 of the uppermost plastic film capacitor winding 10 to the contact part 21 arranged between the uppermost plastic film capacitor winding 10 and the central plastic film capacitor winding 10 and is electrically connected thereto by spot welding, crimping or soldering.

Finally, a terminal wire 44 extends from the top through the hollow capacitor winding core 16 of the uppermost plastic film capacitor winding 10 and the central plastic film capacitor winding 10 to the contact part 21 arranged between the central plastic film capacitor winding 10 and the lowermost plastic film capacitor winding 10. The terminal wire 44 is electrically connected thereto by spot welding, crimping or soldering.

Precisely as in the embodiment shown in FIGS. 1 and 2, an upper insulating cap 36 and a lower insulating cap 38 are positioned at the top and at the bottom, respectively, wherein a holding ring 40 is also arranged on the upper insulating cap 36. Likewise precisely as in the embodiment shown in FIGS. 1 and 2, the contact tips 28 can be pressed into the respective end-face contact layers 12 and 14 by the upper and lower insulating caps 36 and 38 being pushed further onto the plastic film capacitor winding 10 by corresponding compressive force for example during installation in a housing (not shown). In the two embodiments, the plastic film capacitor windings 10 and contact parts 20 can be held in position by the holding ring 40 or a holding bead and a permanent electrical connection can thus be ensured.

By virtue of the resting pieces 30 and the resting areas 32, the penetration depth is limited during fitting in order to prevent damage to the plastic film.

The basic shape of the contact parts 20 and 21 can have very different geometry, wherein, owing to the round shape of the capacitor windings, a ring-shaped geometry appears to be particularly suitable, however.

The contact parts 20 and 21 can be stamped parts. Depending on the intended use, the contact pieces 26 can be bent only to one side or else to both sides from the stamped part. In the case of the two-sided embodiment, two contact layers (winding bridges) positioned together can be electrically connected to one another to form a winding column without any additional metal connection. Metal with good electrical conductivity, in particular brass or copper, is preferred as the base material for the contact parts. A tin plating is advantageous, but not absolutely necessary, for improved contact-making.

By virtue of the contacts disclosed above, the soldering operations which are time-consuming and difficult directly at the end-face contact layers (winding bridges) are no longer required. The size of the contact parts is dependent on the size and performance of the capacitor windings and the area of the end-face contact layers.

The features of the invention disclosed in the description above, in the drawings and in the claims can be essential both individually and in any desired combinations for implementing the invention in its various embodiments.

LIST OF REFERENCE SYMBOLS

10 Plastic film capacitor winding
12, 14 End-face contact layers
16 Capacitor winding cores
18 Terminal wire
20 Contact parts
21 Contact parts
22 Contact carrier
24 Terminal lug
26 Contact pieces
28 Contact tips
30 Resting pieces
32 Resting areas
34 Terminal wire
36 Upper insulating cap
38 Lower insulating cap
40 Holding ring
42 Connecting wire
44 Terminal wire

The invention claimed is:

1. An encased electric three-phase capacitor comprising a housing, a housing cover, three plastic film capacitor windings (10), which are arranged one above the other in the housing, are delta-connected to one another and whose end faces are each provided with an end-face contact layer (12, 14), and three terminal wires (18, 34, 44) which are passed through the housing cover, characterized in that the terminal wires (18, 34, 44) are electrically connected to the corresponding end-face contact layer (12, 14) of the capacitor windings (10) via a respective contact part (20, 21), wherein the contact parts (20, 21) are electrically connected to the respective corresponding end-face contact layer (12, 14) without the use of solder.

2. The encased capacitor as claimed in claim 1, characterized in that in each case one (20) of the contact parts (20, 21) is provided on the end faces of the uppermost and lowermost capacitor windings, and in each case one (21) of the contact parts (20, 21) is provided between the capacitor windings for making contact with each of the two adjacent end-face contact layers (12, 14), and a connecting wire (42) for electrically connecting the uppermost contact part (20) to the lowermost contact part (20) is provided.

3. The encased capacitor as claimed in claim 2, characterized in that the connecting wire (42) is electrically connected to the uppermost and lowermost contact parts (20, 20) by spot welding, crimping or soldering.

* * * * *